US012447790B2

(12) United States Patent
Subramanian et al.

(10) Patent No.: US 12,447,790 B2
(45) Date of Patent: Oct. 21, 2025

(54) METHOD FOR CONTROLLING A FLOW FROM A SOURCE OF PRESSURIZED AIR

(71) Applicant: Volvo Truck Corporation, Gothenburg (SE)

(72) Inventors: Chidambaram Subramanian, Greensboro, NC (US); Drew E. Perkins, Shippensburg, PA (US); Jared Landau, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 173 days.

(21) Appl. No.: 18/240,023

(22) Filed: Aug. 30, 2023

(65) Prior Publication Data

US 2024/0075785 A1 Mar. 7, 2024

(30) Foreign Application Priority Data

Sep. 7, 2022 (EP) ..................................... 22194356

(51) Int. Cl.
*B60G 17/015* (2006.01)
*B60G 17/016* (2006.01)
(Continued)

(52) U.S. Cl.
CPC ....... *B60G 17/0155* (2013.01); *B60G 17/016* (2013.01); *B60G 17/018* (2013.01);
(Continued)

(58) Field of Classification Search
CPC .... B60G 17/0155; B60G 17/016–0165; B60G 17/018; B60G 17/0523;
(Continued)

(56) References Cited

U.S. PATENT DOCUMENTS 7,267,331 B2 9/2007 Holbrook et al.
7,308,432 B2 12/2007 Torii et al.
(Continued)

FOREIGN PATENT DOCUMENTS

CN 112590484 A 4/2021
CN 114872507 A * 8/2022
(Continued)

OTHER PUBLICATIONS

Kim, J. KR 100757813, machine translation. (Year: 2007).*
(Continued)

*Primary Examiner* — Mark L. Greene
(74) *Attorney, Agent, or Firm* — Sage Patent Group

(57) ABSTRACT

The invention relates to a method for controlling a flow from a source of pressurized air to an air bag of a pneumatic suspension arrangement in a vehicle. The method comprises obtaining a set of vehicle condition signals comprising at least two vehicle condition signals, each vehicle condition signal being indicative of an individual current condition associated with said vehicle. The method further comprises, on the basis of said set of vehicle condition signals, determining whether or not there is a need to supply the air bag with air from the source of pressurized air. The method further comprises, in response to determining that there is not a need to supply the air bag with air from the source of pressurized air, preventing pressurized air to be fed from said source of pressurized air to said air bag.

13 Claims, 6 Drawing Sheets

(51) Int. Cl.
B60G 17/018 (2006.01)
B60G 17/052 (2006.01)

(52) U.S. Cl.
CPC .... *B60G 17/0523* (2013.01); *B60G 2202/152* (2013.01); *B60G 2300/026* (2013.01); *B60G 2300/14* (2013.01); *B60G 2400/0511* (2013.01); *B60G 2400/0512* (2013.01); *B60G 2400/0513* (2013.01); *B60G 2400/0521* (2013.01); *B60G 2400/0522* (2013.01); *B60G 2400/0523* (2013.01); *B60G 2400/204* (2013.01); *B60G 2400/302* (2013.01); *B60G 2400/33* (2013.01); *B60G 2400/39* (2013.01); *B60G 2400/40* (2013.01); *B60G 2400/60* (2013.01); *B60G 2400/82* (2013.01); *B60G 2600/02* (2013.01); *B60G 2600/07* (2013.01); *B60G 2600/1876* (2013.01); *B60G 2600/1878* (2013.01); *B60G 2800/914* (2013.01)

(58) Field of Classification Search
CPC .......... B60G 17/0525; B60G 2202/152; B60G 2300/026; B60G 2300/14; B60G 2400/0511; B60G 2400/0512; B60G 2400/0513; B60G 2400/0521; B60G 2400/0522; B60G 2400/0523; B60G 2400/204; B60G 2400/302; B60G 2400/33; B60G 2400/39; B60G 2400/40; B60G 2400/60; B60G 2400/82; B60G 2500/02; B60G 2600/02; B60G 2600/07; B60G 2600/1876; B60G 2600/1878; B60G 2600/914

See application file for complete search history.

(56) References Cited

U.S. PATENT DOCUMENTS

| | | | |
|---|---|---|---|
| 7,441,789 B2 * | 10/2008 | Geiger | B60G 17/0523 280/124.16 |
| 11,390,129 B1 * | 7/2022 | Edren | B60G 17/0155 |
| 2019/0126712 A1 | 5/2019 | Miller, Jr. et al. | |

FOREIGN PATENT DOCUMENTS

| | | | | |
|---|---|---|---|---|
| DE | 102018004569 A1 | | 11/2018 | |
| EP | 2070741 A1 | * | 6/2009 | ......... B60G 17/0525 |
| JP | S5647310 A | | 4/1981 | |
| KR | 100757813 B1 | * | 9/2007 | |

OTHER PUBLICATIONS

Berdesinski, M. EP 2070741, machine translation. (Year: 2009).*
Yang, Z. CN 114872507, machine translation. (Year: 2022).*
Extended European Search Report for European Patent Application No. 22194356.6, mailed Feb. 27, 2023, 12 pages.

* cited by examiner

METHOD FOR CONTROLLING A FLOW FROM A SOURCE OF PRESSURIZED AIR

CROSS REFERENCE TO RELATED APPLICATION

This application claims foreign priority to European Application No. 22194356.6 filed on Sep. 7, 2022, the disclosure and content of which is incorporated by reference herein in its entirety.

TECHNICAL FIELD

The invention relates to a method for controlling a flow from a source of pressurized air to an air bag. The invention further relates to a control unit, a pneumatic suspension arrangement, a vehicle, a computer program and a computer program medium.

The invention can be applied in heavy-duty vehicles, such as trucks, buses and construction equipment. The invention can also be applied in any other suitable vehicle such as a car.

BACKGROUND

For controlling a ride height of a vehicle, pneumatic suspension arrangements may be used. A prior art pneumatic suspension arrangement 1 of a vehicle is illustrated in FIG. 1. A levelling pneumatic flow control valve 2 provides a closed circuit mechanism for maintaining a ride height of the vehicle. As the ride height falls below a required ride height, the levelling pneumatic flow control valve 2 opens an air flow between a source of pressurized air 3 and an air bag 4, and thereby increasing the pressure in the air bag 4 to increase the ride height. Similarly, if the ride height is more than the required ride height, the levelling pneumatic flow control valve 2 shuts the path from the source of pressurized air 3 to the air bag 4 and opens a flow between the air bag 4 to the atmosphere via an exhaust port 5. Ride height may be obtained by the use of a control lever 6 and a push rod 7 connected to an axle 8 of a wheel 9. The push rod 7 will move the control lever 6 when the ride height changes with respect to the axle 8 which thereby controls flow of pressurized air to the air bag 4. This manner of controlling the flow of pressurized air leads to an excessive air consumption as most types of driving operations will consume pressurized air, e.g., braking, accelerating, driving on a rough profile road, lane changes due to a lateral load shift. On a simple road test, it was found that 20 Liters (L) of air is being consumed for a 2 mile drive. As pressurized air needs to be generated by a fuel-driven compressor, excessive fuel consumption follows. As an alternative to above scenario, it is possible to use a specialized control unit which monitors a braking pressure, and which specialized control unit is arranged to block pressurized air to and from the air bag 4 when the braking pressure is greater than a threshold. However, when only considering the braking pressure being high, pressurized air may be blocked in conditions when the pressurized air should be allowed to flow, which over time leads to an inefficient use of pressurized air and thereby inefficient use of fuel.

Hence, there is a desire to more efficiently control the use of pressurized air in a pneumatic suspension arrangement.

SUMMARY

An object of the invention is to improve efficiency of controlling a use of pressurized air in a pneumatic suspension arrangement.

According to a first aspect, the above object is achieved by a method according to claim 1. Hence, there is a method for controlling a flow from a source of pressurized air to an air bag of a pneumatic suspension arrangement in a vehicle. The method comprises obtaining a set of vehicle condition signals comprising at least two vehicle condition signals. Each vehicle condition signal is indicative of an individual current condition associated with said vehicle. The method further comprises, on the basis of said set of vehicle condition signals, determining whether or not there is a need to supply the air bag with air from the source of pressurized air. The method further comprises, in response to determining that there is not a need to supply the air bag with air from the source of pressurized air, preventing pressurized air to be fed from said source of pressurized air to said air bag.

Since the pressurized air is prevented to be fed from said source of pressurized air to said air bag, a reduced consumption of pressurized air is achieved. As the determination of when to prevent the pressurized air to flow is based on said set of vehicle condition signals, vehicle conditions which results in negligible adjustments to ride height of the vehicle is ignored. This ensures that small consumption of air is prevented which over time leads to significant savings. As the set of vehicle condition signals comprises at least two vehicle condition signals indicative of respective individual conditions, a high accuracy of the determination of whether or not there is a need to supply the air bag with air from the source of pressurized air is ensured. As a high accuracy is achieved, preventing the pressurized air will be performed accurately and thereby improve the use of pressurized air. As air consumption is reduced, it follows that fuel consumption is also reduced as less fuel or energy is needed to generate the pressurized air through an air-compressor.

Optionally, the method comprises combining at least two vehicle condition signals in said set of vehicle condition signals to a joint condition signal and comparing said joint condition signal to a joint condition threshold value to determine whether or not there is a need to supply the air bag with air from the source of pressurized air.

In this way, a high accuracy of determining whether or not there is a need to supply the air bag with air from the source of pressurized air is achieved. This is since the determination is based on the joint condition signal, which considers in a joint manner, at least two different vehicle condition signals. Thus, it is ensured that false conditions, e.g., which may occur from a single individual vehicle condition signal, do not trigger a prevention of pressurized air to be fed from said source of pressurized air to said air bag.

Optionally, the method comprises the following for each vehicle condition signal of at least two vehicle condition signals in said set of vehicle condition signals:
  comparing said vehicle condition signal to an individual condition signal threshold value, and
  on the basis of the comparisons, determining whether or not there is a need to supply the air bag with air from the source of pressurized air.

In this way, a high accuracy of determining whether or not there is a need to supply the air bag with air from the source of pressurized air is achieved. This is since the determination is based on each of the individual condition signal threshold values. As each of the vehicle condition signals are compared with their respective threshold value, it is ensured that false conditions, e.g., which may occur from a single individual vehicle condition signal or sensor input, do not incorrectly trigger a prevention of pressurized air to be fed from said source of pressurized air to said air bag.

Optionally, a flow from the source of pressurized air to the air bag is controlled by a pneumatic flow control valve, wherein the pneumatic flow control valve comprises a pilot port which when pressurized is arranged to block a flow from the source of pressurized air to the air bag, and wherein preventing the pressurized air to be fed from said source of pressurized air to said air bag comprises pressurizing the pilot port.

In this way a more efficient manner of preventing pressurized air to be fed from said source of pressurized air to said air bag is achieved. This is since pressuring the pilot port is a quick control mechanism which enables the use of preventing pressurized air to be fed from said source of pressurized air to said air bag without the need of expensive and/or high precision controlling equipment.

Optionally, the pneumatic suspension arrangement comprises a solenoid control valve attached with the source of pressurized air and the pilot port. In these embodiments, preventing the pressurized air to be fed from said source of pressurized air to said air bag comprises controlling the solenoid control valve to pressurize the pilot port.

In this way it is enabled to control the prevention of pressurized air to be fed from said source of pressurized air to said air bag by means of controlling the solenoid control valve. Thus, the controlling mechanism is enabled to be directly controlled using electronic signals.

This allows for a more flexible control of the flow of pressurized air.

Optionally, determining whether or not there is a need to supply the air bag with air from the source of pressurized air comprises using a predetermined vehicle dynamics model to predict an air consumption based on the set of vehicle condition signals. In these embodiments, preventing the pressurized air to be fed from said source of pressurized air to said air bag is performed when the predicted air consumption exceeds a threshold.

In this way, it is enabled to reduce the air consumption in the pneumatic suspension arrangement. This is since the set of vehicle condition signals can be used with the predetermined vehicle dynamics model to predict an air consumption. In this way, the pressurized air may be controlled on the basis of the prediction. As air consumption is reduced, it follows that fuel and/or energy consumption is also reduced as less fuel and/or energy is needed to generate the pressurized air through an air-compressor.

Optionally, determining whether or not there is a need to supply the air bag with air from the source of pressurized air, comprises using a trained machine learning model with the set of vehicle condition signals as input.

In this way, it is enabled to reduce the air consumption in the pneumatic suspension arrangement. This is since the trained machine learning model is able to more accurately determine whether there is a need to supply the air bag with air from the source of pressurized air. This is since the trained machine learning model has been trained on simulated and/or real vehicle condition signals such that it statistically can map the set of vehicle condition signals to whether or not there is a need to supply the air bag with air from the source of pressurized air with respect to a total air consumption over a time period. As air consumption is reduced, it follows that fuel and/or energy consumption is also reduced as less fuel and/or energy is needed to generate the pressurized air through an air-compressor.

Optionally, the trained machine learning model is a reinforcement machine learning model arranged to determine whether or not there is a need to supply the air bag with air from the source of pressurized air by predicting an air consumption for a time period when preventing and when not preventing the pressurized air to be fed from said source of pressurized air to said air bag.

In this way, the trained machine learning model can predict how a prevention of pressurized air will affect an air consumption over a time period. In this way, determining whether there is a need to supply the air bag with air from the source of pressurized air can be performed with higher accuracy by using said prediction.

Optionally, the set of vehicle condition signals comprises any one or more out of:
- a vehicle condition signal indicative of a brake pedal position of the vehicle,
- a vehicle condition signal indicative of a brake pressure of at least one brake of the vehicle,
- a vehicle condition signal indicative of a throttle of an engine of the vehicle,
- a vehicle condition signal indicative of a velocity and/or a speed of the vehicle,
- a vehicle condition signal indicative of a gear and/or a gear shifting of the vehicle,
- a vehicle condition signal indicative of a roll and/or a roll rate of the vehicle,
- a vehicle condition signal indicative of a pitch and/or a pitch rate of the vehicle,
- a vehicle condition signal indicative of a yaw and/or a yaw rate of the vehicle,
- a vehicle condition signal indicative of a steering input of the vehicle,
- a vehicle condition signal indicative of a load and/or a weight of the vehicle,
- a vehicle condition signal indicative of a position of the vehicle, and
- a vehicle condition signal indicative of a road profile of a road travelled by the vehicle.

According to a second aspect, there is provided a control unit to perform the method according to the first aspect. The control unit may be an Electronic Control Unit.

According to a third aspect, there is provided a pneumatic suspension arrangement for a vehicle comprising the control unit according to the second aspect. The suspension arrangement comprises a source of pressurized air arranged to supply pressurized air to an air bag.

Optionally, the pneumatic suspension arrangement comprises a pneumatic flow control valve arranged to control a flow from the source of the pressurized air to the air bag, and wherein the pneumatic flow control valve comprises a pilot port which when pressurized is arranged to block a flow from the source or pressurized air to the air bag.

According to a fourth aspect, there is provided a vehicle comprising the pneumatic suspension arrangement according to the third aspect.

According to a fifth aspect, there is provided a computer program comprising program code means for performing the method according to the first aspect, when said program is run on a computer.

According to a sixth aspect, there is provided a computer program medium carrying a computer program comprising program code means for performing the method according to the first aspect, when said program is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 2:
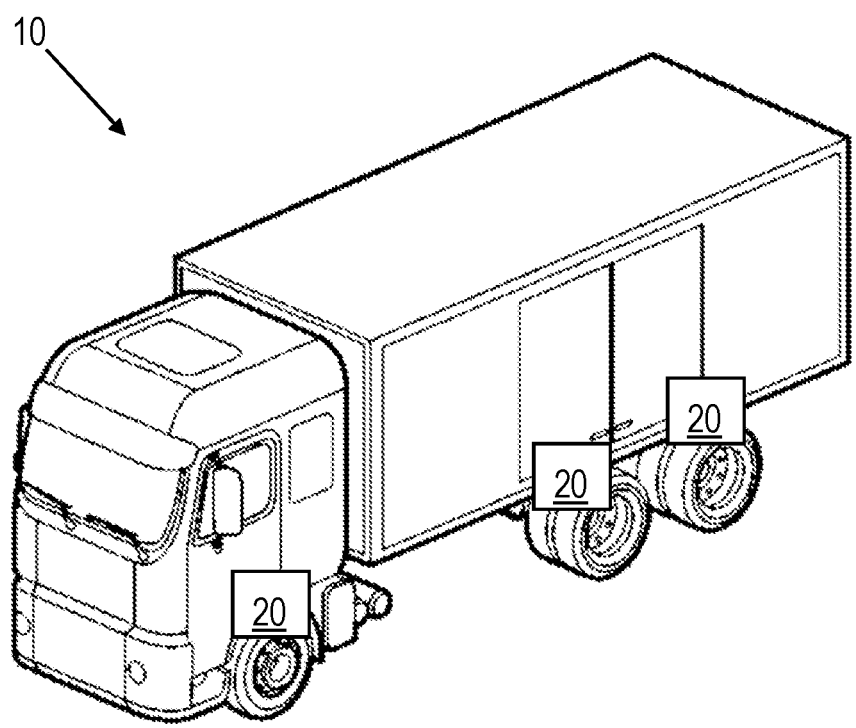
FIG. 2 is a schematic overview of a vehicle in accordance with embodiments herein.

FIG. 2 illustrates a schematic overview of a vehicle 10. Although illustrated as a truck in FIG. 2, embodiments herein are applicable to any suitable vehicle e.g., any of a car, a truck, a bus, etc. The vehicle 10 may be manually operated by a user, e.g., a driver. The vehicle 10 may also be operated remotely and/or may be at least partly autonomous.

The vehicle 10 comprises a pneumatic suspension arrangement 20. The pneumatic suspension arrangement 20 may be for any suitable axle and/or wheel in the vehicle 10. The pneumatic suspension arrangement 20 is arranged to provide suspension for at least a part of the vehicle 10 and may also adjust a ride height of at least part of the vehicle 10.

The vehicle 10 may comprise a set of sensors (not shown). The set of sensors may comprise any one or more suitable sensors, e.g., one or more out of a Light Detection and Ranging (Lidar) sensor, a positioning sensor such as a Global Positioning System (GPS) sensor, Global Navigation Satellite System (GNSS) sensor, a gyroscope, a speedometer, a Radio Detection and Ranging (Radar) sensor, accelerometer in three axis, a roll sensor, a pitch sensor, and a yaw rate sensor. The set of sensors may be able to generate and/or trigger one or more vehicle condition signals, e.g., indicative of any one or more out of: a brake pedal position of the vehicle 10, a brake pressure of at least one brake of the vehicle 10, a throttle of an engine of the vehicle 10, a velocity and/or a speed of the vehicle 10, a gear and/or a gear shifting of the vehicle 10, a roll and/or a roll rate of the vehicle 10, a pitch and/or a pitch rate of the vehicle 10, a yaw and/or a yaw rate of the vehicle 10, a steering input of the vehicle 10, a load and/or a weight of the vehicle 10, a position of the vehicle 10, and a road profile of a road travelled by the vehicle 10.

Figure 3:
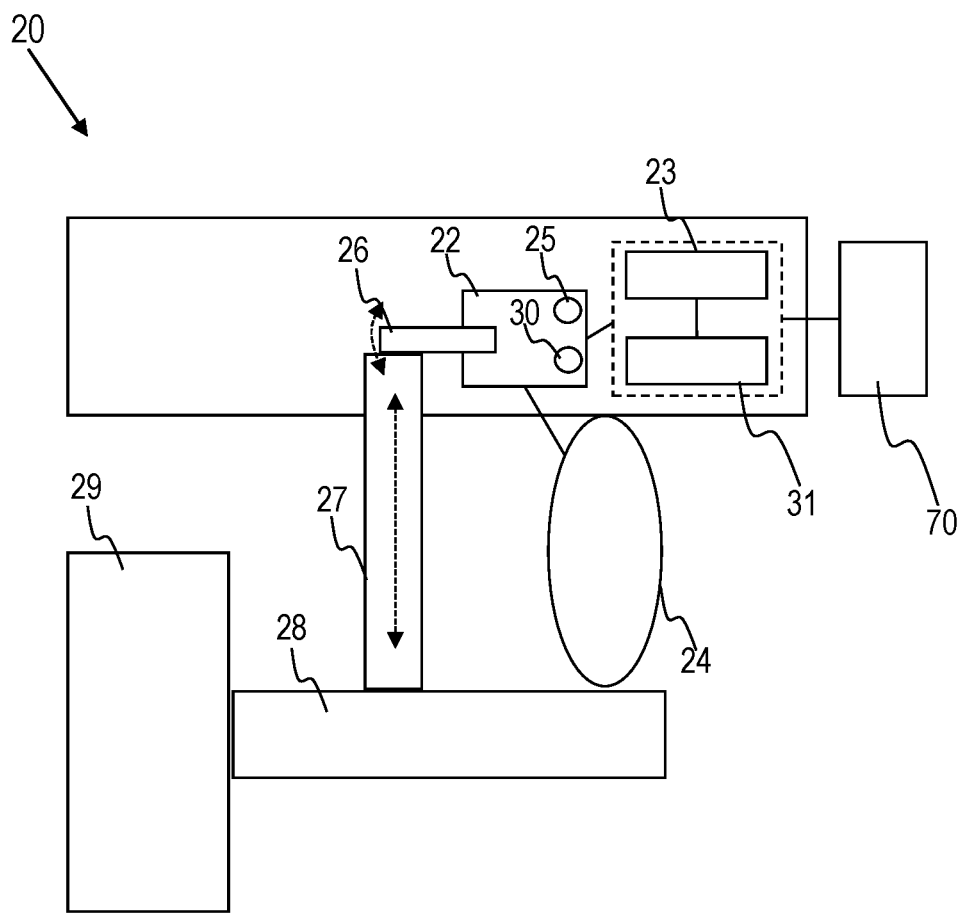
FIG. 3 is a schematic block diagram of a pneumatic suspension arrangement in accordance with embodiments herein.

FIG. 3 Illustrates an example embodiment of the pneumatic suspension arrangement 20.

The following components, and respective location and interaction in the pneumatic suspension arrangement 20 is to be seen as a non-limiting example. Any other suitable components may be used in the pneumatic suspension arrangement 20 in any suitable manner.

The pneumatic suspension arrangement 20 comprises an air bag 24. The air bag 24 may also be referred to as an air bellow or a pneumatic spring. The air bag 24 may be arranged to suspend a sprung mass of the vehicle 10. The air bag 24 may further provides stiffness and/or damping, while connecting respective axles of the vehicle 10, i.e. connecting an unsprung mass to the sprung mass.

The pneumatic suspension arrangement 20 comprises a pneumatic flow control valve 22. The pneumatic flow control valve 22 may be arranged with one or more configurations. A first configuration allows a flow from a source of pressurized air 23 and the air bag 24. A second configuration prevents a flow from the source of pressurized air 23 to the air bag 24. The first configuration and/or a third configuration may allow a flow from the air bag 24 to an exhaust port 25. In other words, when there is a need to increase a ride height, the pneumatic flow control valve 22 will supply air from the source of pressurized air 23 to the air bag 24, and when there is a need to decrease the ride height, the pneumatic flow control valve 22 will supply air from the air bag 24 to the exhaust port 25.

As an example, the pneumatic flow control valve 22 may comprise a control lever 26. The control lever 26 may be connected to a rotary component of the pneumatic flow control valve 22 which is used to switch a flow rate and to control a flow direction from the source of pressurized air 23 to the air bag 24, and/or from the source of pressurized air 23 and/or the air bag 24 to the exhaust port 25.

The control lever 26 may also be referred to as a control arm. The control lever 26 may be used to control the configuration of the pneumatic flow control valve 22 based on a position and/or rotation of the control lever 26. The rotation and/or movement of position of the control lever 26 may associated with a mechanism which moves an orifice of the pneumatic flow control valve 22 to different ports, e.g., such that pressurized air is supplied from the source of pressurized air 23 to the air bag 24, that the pressurized air is exhausted from the air bag 24 through the exhaust port 25, or that a flow of air in the pneumatic flow control valve 22 is blocked, i.e. both to the air bag 24 and to the exhaust port 25. This may be implemented in any suitable manner, for example, when the control lever 26 is rotated clockwise i.e. upwards, a flow may be allowed from the source of pressurized air 23 to the air bag 24, and a flow from the air bag 24 to the exhaust port 25 may be blocked. When the control lever 26 is rotated anti-clockwise, i.e., downwards, a flow may be allowed from the air bag 24 to the exhaust port 25, and a flow from the source of pressurized air 23 to the air bag 24 may be blocked. There may be a small window of rotation in the control lever 26, e.g., +−10 degrees where air will not flow to either exhaust port 25 or the air bag 24.

The control lever 26 may be connected to a push rod 27, which is connected to an axle 28 of a wheel 29. The push rod 27 may move the control lever 26 when a ride height changes with respect to the axle 28 which control lever 26 may then, as described above, control a flow of pressurized air to and/or from the air bag 24.

The pneumatic suspension arrangement 20 may comprise a pilot port 30. When the pilot port 30 is pressurized, the pneumatic flow control valve 22 is arranged to block a flow from the source of pressurized air 23 to the air bag 24. Pressurizing the pilot port 30 may further block a flow from the air bag 24 to the exhaust port 24. In other words, when the pilot port is pressurized, the flow of air in the pneumatic flow control valve 22 is prevented. A pilot port as used herein means a port for controlling a valve, i.e. the opening and closing of the pneumatic flow control valve 2 by supplying pressure or not to the pilot port.

The pneumatic suspension arrangement 20 may comprise a solenoid control valve 31. The solenoid control valve 31 may comprise a supply port, a delivery port and an exhaust port.

The flow between the supply port to the exhaust port, or supply port to delivery port is arranged to be switched using a solenoid that is electrically controlled. The solenoid control valve 31 may be attached with the source of pressurized air 23 and the pilot port 30. Preventing pressurized air to be fed from the source of pressurized air 23 to the air bag 24, or in any other direction, may thus be possible by controlling the solenoid control valve 31 to pressurize the pilot port 30.

The pneumatic suspension arrangement 20 may be arranged in any suitable part/s of the vehicle 10. While the pneumatic suspension arrangement 20 is exemplified with respect to a single wheel and axle, each wheel and/or axle may comprise a corresponding pneumatic suspension arrangement, wherein each of the respective pneumatic suspension arrangements may be communicatively coupled such that it is possible to obtain measurements or parameters from all of the pneumatic suspension arrangements.

Embodiments herein may be performed by a control unit 70. The control unit 70 may be comprised in the vehicle 10, e.g., as part of the pneumatic suspension arrangement 20, but may also be comprised in any other suitable location communicatively connected with the pneumatic suspension arrangement 20 and/or any other corresponding pneumatic suspension arrangement in the vehicle 10. The control unit 70 may be an ECU. The control unit 70 may be connected with the pneumatic flow control valve 22 arranged to be able to prevent the pressurized air to be fed from the source of pressurized air 23 to the air bag 24, or in any other direction. Preventing the pressurized air to be fed from the source of pressurized air 23 to the air bag 24, or in any other direction, may be performed in any suitable manner, e.g. by pressurizing the pilot port 30. In some embodiments, the control unit 70 is connected with the solenoid control valve 31. In these embodiments the control unit 70 may be able to prevent the pressurized air to be fed from the source of pressurized air 23 to the air bag 24, or in any other direction, by controlling the solenoid control valve 31 using electronic signals, e.g. by digital or analog signalling means. The solenoid control valve 31 may then, based on the control signals, control the pressure of pilot port and thereby also control the flow of air in the pneumatic suspension arrangement 20.

Figure 4:
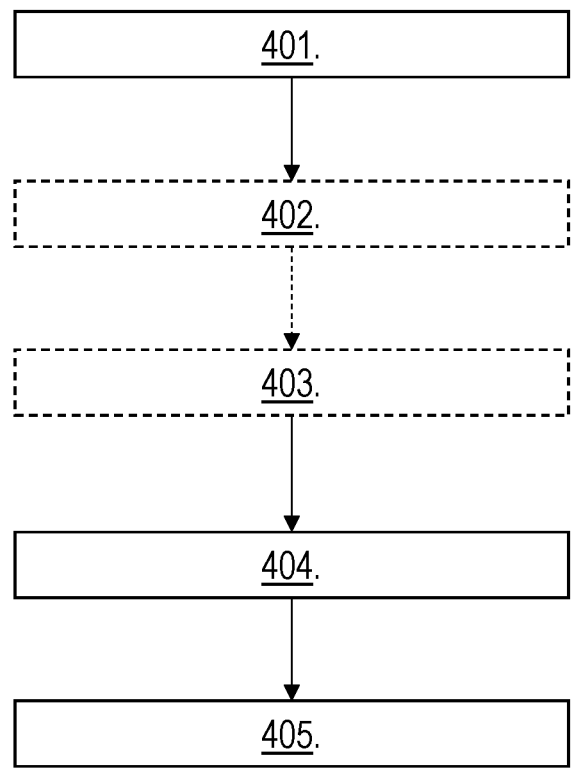
FIG. 4 is a flowchart of a method according to embodiments herein.

FIG. 4 illustrates a method for controlling a flow from the source of pressurized air 23 to the air bag 24 of the pneumatic suspension arrangement 20 in the vehicle 10. The method may e.g. be performed by the control unit 70. The method may comprise one or more of the following actions which actions may be taken in any suitable order. Dashed boxes in FIG. 4 indicates optional actions.

Action 401

The method comprises obtaining a set of vehicle condition signals comprising at least two vehicle condition signals. Each vehicle condition signal may be a respective Controller Area Network (CAN) signal and/or a respective sensor signal, e.g., any one or more out of acceleration, braking, turning, wheel speed, vehicle velocity, lateral velocity, GPS/GNSS signal. Each vehicle condition signal is indicative of an individual current condition associated with said vehicle 10. The vehicle condition signals may be generated by and/or triggered by any suitable sensor(s) comprised in, and/or attached to the vehicle 10.

The set of vehicle condition signals comprises any one or more out of:

a vehicle condition signal indicative of a brake pedal position of the vehicle 10, a vehicle condition signal indicative of a brake pressure of at least one brake of the vehicle 10, a vehicle condition signal indicative of a throttle of an engine of the vehicle 10, a vehicle condition signal indicative of a velocity and/or a speed of the vehicle 10, a vehicle condition signal indicative of a gear and/or a gear shifting of the vehicle 10, a vehicle condition signal indicative of a roll and/or a roll rate of the vehicle 10, a vehicle condition signal indicative of a pitch and/or a pitch rate of the vehicle 10, a vehicle condition signal indicative of a yaw and/or a yaw rate of the vehicle 10, a vehicle condition signal indicative of a steering input of the vehicle 10, a vehicle condition signal indicative of a load and/or a weight of the vehicle 10, a vehicle condition signal indicative of a position of the vehicle 10, and a vehicle condition signal indicative of a road profile of a road travelled by the vehicle 10.

In other words, the set of vehicle condition signals may comprise a number of vehicle condition signals which together provides detailed information of a current condition of the vehicle 10. Embodiments herein may relate to controlling the flow of air in the pneumatic suspension arrangement 20 using a wide range of vehicle condition signals. In some scenarios, complex vehicle conditions may need to be assessed, e.g., when the vehicle 10 drives in an off-road terrain, and in these scenarios, an increased number of vehicle condition signals improves the information of the current vehicle condition. In these embodiments, the set of vehicle condition signals may e.g., comprise at least three vehicle condition signals.

Action 402

In some embodiments, the method comprises combining at least two vehicle condition signals in said set of vehicle condition signals to a joint condition signal. In other words, the joint condition signal may be for assessing a vehicle condition comprising of at least two parts. This allows for assessment of complex vehicle conditions, i.e. vehicle conditions which are defined by at least two vehicle condition signals jointly, i.e. turning motion and braking pressure assessed in a joint manner.

Action 403

In some embodiments, the method comprises: for each vehicle condition signal of at least two vehicle condition signals in said set of vehicle condition signals, comparing said vehicle condition signal to an individual condition signal threshold value. In other words, each vehicle condition signal may be compared with a respective threshold value. For example, the set of vehicle condition signals may comprise a vehicle condition signal which indicates a brake pedal sensor input which is compared with a brake pedal threshold, and the set of vehicle condition signals may also comprise a vehicle condition signal which indicates a steering wheel sensor input which is compared with a steering angle threshold.

Action 404

The method comprises, on the basis of said set of vehicle condition signals, determining whether or not there is a need to supply the air bag 24 with air from the source of pressurized air 23. As the basis for determination is the set of vehicle condition signals, comprising at least two vehicle condition signals, the determination can be made with high accuracy. This is since the determination does not depend on any single sensor input or vehicle condition signal.

In some embodiments, determining whether or not there is a need to supply the air bag 24 with air from the source of pressurized air 23 comprises comparing said joint condition signal of action 402 to a joint condition threshold value. In some embodiments, comparing said joint condition signal with the joint condition threshold value may be performed by the use of one or more logical gates, e.g., arranged in the control unit 70. As an example, it may be determined that there is not a need to supply the air bag when said joint condition signal does not exceed said joint condition threshold value. In this way high accuracy of determining whether or not there is a need to supply the air bag with air from the source of pressurized air is achieved. This is since the determination is based on the joint condition signal, which considers in a joint manner, at least two different vehicle condition signals.

Thus, it is ensured that false conditions, e.g., which may occur from a single individual vehicle condition signal, do not trigger a prevention of pressurized air to be fed from said source of pressurized air to said air bag.

Figure 1:
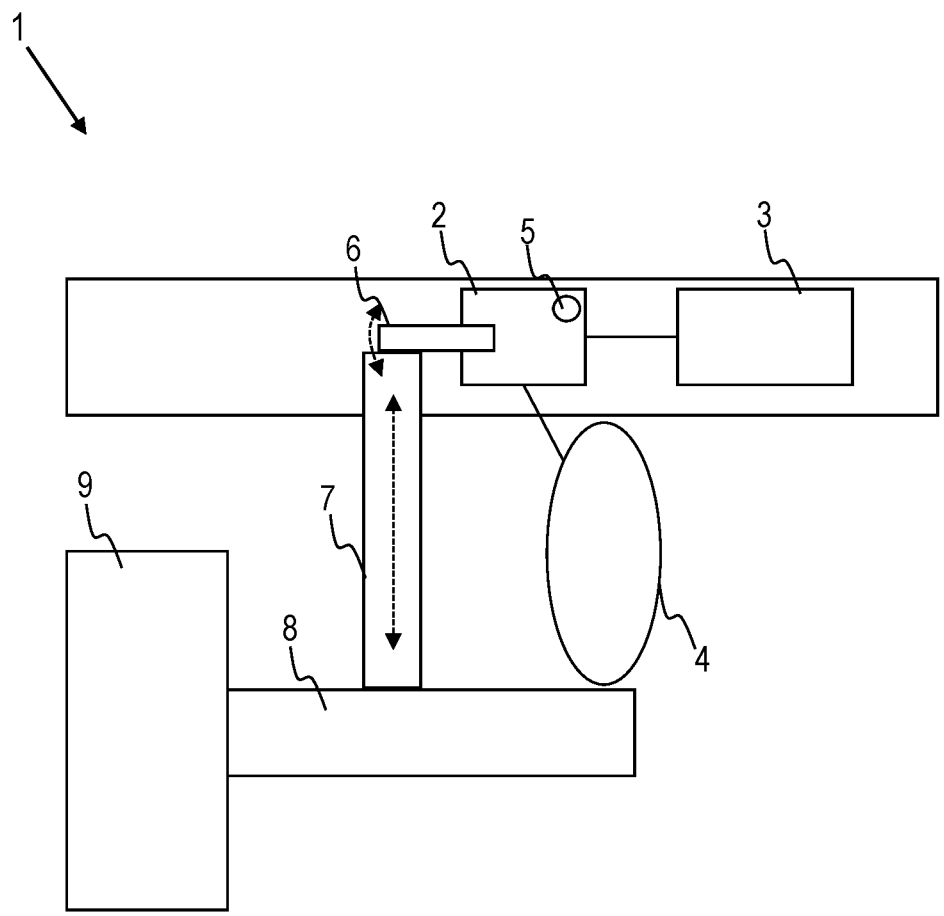
FIG. 1 is an illustration of a pneumatic suspension arrangement in prior art.

In some embodiments, determining whether or not there is a need to supply the air bag 24 with air from the source of pressurized air 23 is performed on the basis of the on the basis of the comparisons of each respective vehicle condition signal to the respective individual condition signal threshold value, e.g., as in action 403 above. In some embodiments, said comparisons may be performed by the use of the one or more logical gates, e.g., arranged in the control unit 70. In some of these embodiments, the comparisons may determine whether or not there is a need to supply the air bag 24 with air from the source of pressurized air 23, based on any suitable heuristics and/or rules which may be predefined. For example, it may be determined that there is not a need to supply the air bag 24 when none of the respective vehicle condition signals exceed their respective individual condition signal threshold value. As another example, it may be determined that there is a need to supply the air bag only when all of the respective vehicle condition signals exceed their respective individual condition signal threshold value. In this way, high accuracy of determining whether or not there is a need to supply the air bag with air from the source of pressurized air is achieved. This is since the determination is based on each of the individual condition signal threshold values. As each of the vehicle condition signals are individually considered, it is ensured that false conditions, e.g., which may occur from a single individual vehicle condition signal or sensor input, do not incorrectly trigger a prevention of pressurized air to be fed from said source of pressurized air to said air bag. This means that for some scenarios, if one of the respective vehicle condition signals does not exceed their respective individual condition signal threshold value, legacy behavior, e.g., as in FIG. 1 may be performed, i.e. no prevention of an air flow. Thus, it is possible to ensure that air consumption is reduced for many scenarios, but a fall back to legacy behavior is provided when necessary, i.e. to ensure some basic comfort level of the vehicle 10. As air consumption is reduced, it follows that fuel and/or energy consumption is also reduced as less fuel and/or energy is needed to generate the pressurized air through an air-compressor.

In some embodiments, determining whether or not there is a need to supply the air bag 24 with air from the source of pressurized air 23 comprises using a predetermined vehicle dynamics model to predict an air consumption based on the set of vehicle condition signals.

The predetermined vehicle dynamics model may be a dynamic model that includes a set degree of freedom for vehicle models, suspension models, damper models, and/or tire model. The dynamic model may for example comprise a Pacejka and/or elliptical ring model. A Pacejka model as used herein means a tire model for estimating tire forces using coefficients obtained via test data. The estimated tire forces may be used in a vehicle model for frictional forces generated at a tire of the vehicle 10 which would further make it possible to derive an acceleration at the center of gravity (CoG) of the vehicle 10, e.g., as a sum of all tire's longitudinal friction forces is equal to the mass of the vehicle 10 times the acceleration. The mass of the vehicle 10 may be predefined. Similarly, lateral forces from Pacejka estimation may be used for lateral acceleration to derive a maneuverability of the vehicle 10. When the predicted air consumption exceeds a threshold, it may be considered that there is not a need to supply the air bag 24 with air from the source of pressurized air 23. In this way, it may be possible to limit the air consumption to a predefined total air consumption budget and to only use pressurized air when determined for certain vehicle conditions. As air consumption is limited, it follows that fuel and/or energy consumption used for generating the pressurized air through an air-compressor is also limited.

In some of these embodiments, determining whether or not there is a need to supply the air bag 24 with air from the source of pressurized air 23 may further use the predetermined vehicle dynamics model to predict a comfort level. The above predicted air consumption may be weighted based on the predicted comfort level. In this way, air consumption may be limited while also considering a comfort of the driver/passengers in the vehicle 10. The comfort level may be based on any suitable comfort input, e.g., based on any one or more out of:

- a variation in pressure of the pneumatic suspension arrangement 20 such as a number of pressure changes, i.e. direction and/or pressure of the air flow, e.g., where a lower variation provides a higher comfort level,
- a user input specifying whether the pneumatic suspension arrangement 20 shall be weighted towards comfort, traction and/or tire wear,
- a predetermined parameter for estimated acceleration at different seats of the vehicle 10, e.g., passenger/driver seats, and/or
- an acceleration and/or rate of change in ride height of a driver and/or passenger seats, e.g., where a lower acceleration and/or rate of change in ride height of any the driver and/or passenger seats provides a higher comfort level.

In other words, the comfort level may be inversely proportional to a vertical acceleration and/or motion at a particular seat, which acceleration and/or motion be dependent on any one or more out of the suspension parameters above.

Additionally or alternatively, the prediction of the air consumption may comprise a prediction of any one or more out of: an air consumption rate, a total air consumption over a time period, and/or a total air consumption over a distance to travel with the vehicle 10. The prediction may for example consider the road profile of a road travelled by the vehicle 10 and how adjustments to the flow of air accumulate when the vehicle 10 travels on the road.

In some embodiments, determining whether or not there is a need to supply the air bag 24 with air from the source of pressurized air 23, comprises using a trained machine learning model with the set of vehicle condition signals as input. The trained machine learning model may for example comprise a Neural Network (NN) such as an Artificial NN (ANN) or a Recurrent NN (RNN)

The trained machine learning model may be trained on real and/or simulated sensor data with the corresponding consumed pressurized air. The trained machine learning model may be stored in the control unit 70 and/or at least partly in a remote server, e.g., as part of a cloud resource. The trained machine learning model may for example be trained to determine an improved, e.g., optimal, use of pressurized air which may avoid scenarios of repeatedly pressurizing the air bag 24 slightly and then exhausting the air after a short time, e.g. shorter than a threshold. In some embodiments, the trained machine learning model is additionally trained by weighting the air consumption with a comfort level as defined above.

In this way, it is possible to get an improved air consumption while also considering a comfort level of the vehicle 10. The trained machine learning model may alternatively be trained to perform the above-mentioned prediction of the air consumption.

The trained machine learning model may be trained for the specific vehicle 10 making it improved, e.g., optimized, for the vehicle 10. Alternatively, the trained machine learning model may be trained for a generic vehicle, e.g., based on a wide range of different vehicles.

The trained machine learning model may be trained to determine whether or not there is a need to supply the air bag 24 with air from the source of pressurized air 23 based on a certain location, e.g., a GPS coordinate.

In some embodiments, the training of the machine learning model may be performed without knowledge of the specific configuration of the vehicle 10. Training the machine learning model may as an example comprise:
 obtaining permutations and/or combinations of different vehicles, e.g., trucks, respective sensor data, respective routes, respective locations of preventing or allowing pressurized air consumption, and respective air consumption,
 optionally examining the permutations and/or combinations, e.g., to define any one or more out of data patterns, anomalies, optimal air usage parameters,
 optionally, setting boundary conditions for when or when not to consider that there is a need to supply pressurized air from an air source, e.g., based on any one or more out of the defined patterns, anomalies, and/or optimal air usage parameters, and
 generating a machine learning model, e.g., a neural network, which can determine whether or not there is a need to supply the air bag 24 with air from the source of pressurized air 23 based on the set of vehicle condition signals.

In some embodiments, the trained machine learning model is a reinforcement machine learning model arranged to determine whether or not there is a need to supply the air bag 24 with air from the source of pressurized air 23 by predicting an air consumption for a time period when preventing and when not preventing the pressurized air to be fed from said source of pressurized air 23 to said air bag 24. The trained machine learning model may use the predicted air consumption as an immediate reward or penalty to the reinforcement learning model. Additionally, the comfort level may be used as an immediate reward or penalty to the reinforcement learning model. The action space in the reinforcement learning model may be whether or not to prevent supplying the air bag 24 with air from the source of pressurized air 23.

In some embodiments herein, determining whether or not there is a need to supply the air bag 24 with air from the source of pressurized air 23, comprises a state estimation of at least one axle in the vehicle 10 different from the axle 28. The at least one axle may have the same or a different type of suspension arrangement than the suspension arrangement of axle 28. The state estimation may for example be performed using a Kalman filter. When the state estimation indicates a difference in the axles, e.g., in any one or more parameters, a ride height difference may be estimated which may be used to determine whether or not there is a need to supply the air bag 24 with air from the source of pressurized air 23, e.g., when the difference is greater than a threshold.

In some embodiments, e.g., by using predetermined vehicle dynamics model, determining that there is not a need to supply the air bag 24 with air from the source of pressurized air 23, may comprise determining that the pressurized air in the source of pressurized air 23 is consumed faster than a threshold, e.g., faster than a predefined rate.

Action 405

The method comprises, in response to determining that there is not a need to supply the air bag 24 with air from the source of pressurized air 23, e.g., as in action 404, preventing pressurized air to be fed from said source of pressurized air 23 to said air bag 24.

In some embodiments, a flow from the source of pressurized air to the air bag 24 is controlled by a pneumatic flow control valve 22. In some of these embodiments the pneumatic flow control valve 22 may comprise the pilot port 30 which when pressurized is arranged to block a flow from the source of pressurized air 23 to the air bag 24. Preventing the pressurized air to be fed from said source of pressurized air 23 to said air bag 24 may in these embodiments comprise pressurizing the pilot port 30. In a corresponding manner, pressurizing the pilot port 30 may also block the exhaust port 25 such that no air is exhausted from the pneumatic suspension arrangement 20.

In some embodiments, the pneumatic suspension arrangement 20 comprises the solenoid control valve 31 attached with the source of pressurized air 23 and the pilot port 30. In these embodiments, preventing the pressurized air to be fed from said source of pressurized air 23 to said air bag 24 comprises controlling the solenoid control valve 31 to pressurize the pilot port 30.

In some embodiments, preventing the pressurized air to be fed from said source of pressurized air 23 to said air bag 24 is performed when the predicted air consumption, e.g., as in action 404 above, exceeds a threshold. In some of these embodiments preventing the pressurized air to be fed from said source of pressurized air 23 to said air bag 24 is further performed based on a comfort condition, e.g., by comparing the predicted comfort level of action 404 above. For example, to prevent the pressurized air to be fed from said source of pressurized air 23 to said air bag 24, the comfort level may need to be above a threshold.

In some embodiments, the predicted air consumption is weighted with the predicted comfort level preventing the pressurized air to be fed from said source of pressurized air 23 to said air bag 24 is performed when the weighted air consumption exceeds a threshold. In this way, a comfort level may be kept while reducing air consumption.

The above embodiments will now be further explained and exemplified below. The embodiments below may be combined with any suitable embodiment above.

Logic-Based Modelling

Embodiments herein may be based at least partly on one or more logic-based models. The use of the one or more logic-based models may for example be characterized by the use of the one or more logic gates as discussed in action 404.

In some of these embodiments, the set of vehicle condition signals may comprise a current and/or a rate of change in any one or more out the following vehicle conditions: brake pedal position, throttle pedal position, steering wheel angle. These vehicle conditions may be input by a driver of the vehicle 10. The set of vehicle condition signals may be compared with respective threshold values, e.g., as in any of actions 403-404, and/or compared with a predefined bandlimit in combination of logical operators to provide a final output for whether or not to limit pressurized air from the source of pressurized air 23, e.g., as in action 404-405 above. Comparing with the predefined bandlimit may comprise checking whether or not the set of vehicle condition signals are within a predefined allowable range, e.g., when transformed using a Fourier transformation. The set of vehicle condition signals may also comprise vehicle conditions not directly input by a driver, e.g., reactive forces on the vehicle 10, e.g., which may be initiated or based on driver input, such as a roll, pitch, and/or yaw rate of the vehicle 10.

The one or more logical gates may then be used to determine whether or not there is a need to supply the air bag 24 with air from the source of pressurized air 23, e.g., as in action 404, by passing the set of vehicle condition signals through the one or more logical gates. When determined that there is not a need to supply the air bag 24 with air from the source of pressurized air 23, the one or more logical gates may generate a signal which may be used to prevent the pressurized air to be fed from said source of pressurized air 23 to said air bag 24, e.g., as in action 405. The generated signal may for example be used to activate the solenoid control valve 31. As an example, the one or more logical gates may be electronic/digital circuits which compare respective values of the set of vehicle condition signals with respective threshold values and logical operators, such as any one or more out of larger than, greater than, equals to, or a combination thereof. For example, the one or more logical gates may determine that there is not a need to supply the air bag 24 with air from the source of pressurized air 23, e.g., when an acceleration of the vehicle 10 is below an acceleration threshold and a yaw rate of the vehicle 10 is below a yaw rate threshold. In some embodiments, any one or more vehicle condition signals in the set of vehicle condition signals, e.g., all of the set of vehicle condition signals, may at least need to be above i.e., greater than, a respective predetermined threshold.

Physics-Based Modelling

Embodiments herein may be based at least partly on one or more physics-based models. The use of the one or more physics—based models may for example be characterized by the use of the predetermined vehicle dynamics model as discussed in action 404.

The predetermined vehicle dynamics model may for example comprise of a 4 Degree of Freedom (DoF) model, a 3 DoF model, or an 8+ DoF model. The 4 DoF model comprises a pitch of the vehicle 10, angle or angular rate, a vertical motion of a sprung mass, e.g., in the suspension arrangement 20, a vertical motion of a front axle of the vehicle 10, and a vertical motion of one or more rear axles of the vehicle 10, e.g., combined as one vertical motion. The 3 DoF model comprises a roll e.g. of the vehicle 10, angle or angular rate, a vertical motion of the left wheels of the vehicle 10, and a vertical movement of the right wheels of the vehicle 10. The 8+ DoF model comprises a pitch of the vehicle 10 e.g., angle or angular rate, a roll of the vehicle 10 e.g., angle or angular rate, a yaw of the vehicle 10 e.g., angle or angular rate, a vertical motion of the sprung mass, e.g., in the suspension arrangement 20, a pitch of the vehicle 10, a pitch of the vehicle 10, a vertical motion for each respective wheel in the vehicle 10. In some embodiments, to capture the states in the vehicle 10 more accurately, a 15+ DoF model may also be possible which further may comprise any of the above mentioned DoF models and a vertical motion of each respective seat in the vehicle 10 and/or a respective motion, e.g., vertical and/or longitudinal and/or lateral, for each respective tire in the vehicle 10.

Any of the above-mentioned DoF models may be deployed and embedded inside the control unit 70 and may be used to accurately model the vehicle 10 and be used to predict the air consumption, e.g., as part of any suitable embodiments herein. The above-mentioned DoF models may further be used to estimate the comfort level of embodiments herein, e.g., as different vertical motions of the seats in the vehicle may be derived and/or extrapolated from the respective DoF models.

The predetermined vehicle dynamics model may comprise vehicle specific parameters for the vehicle 10, e.g., any one or more out of wheelbase, CoG, and vehicle load etc. These vehicle specific parameters may be set manually and/or during production of the vehicle 10. The vehicle specific parameters may be needed to satisfy the predetermined vehicle dynamics model to provide accurate outputs. The predetermined vehicle dynamics model may receive real-time inputs from the set of sensors of the vehicle 10 and/or driver inputs, e.g., by obtaining the above-mentioned set of vehicle condition signals. The real-time inputs may be used to estimate any one or more out of: a roll, a pitch, a yaw, a bounce and/or a vertical motion of each wheel ends of the vehicle 10 and/or the parameters of the DoF models above. The estimations may further comprise predicting an air consumption of the pneumatic suspension arrangement 20, e.g. as in action 404 and/or based on an obtained pressure modulation in the pneumatic flow control valve 22. The estimation may further comprise predicting a comfort level of user in the vehicle 10, e.g. as in action 404 and/or by using obtaining an acceleration level at the seat of the vehicle 10.

Using the predetermined vehicle dynamics model may thus comprise a weighted method for when to prevent pressurized air to be fed from said source of pressurized air 23 to said air bag 24. For example, a predicted air consumption value may be weighted with the predicted comfort level, and it may be determined that there is not a need to supply the air bag 24 with air from the source of pressurized air 23, e.g., as in action 404, when the weighted predicted air consumption value is above a threshold. In this way, an efficient air consumption is maintained while also managing a good comfort level of the vehicle 10. In some embodiments, a weight of the comfort level, e.g., a coefficient, may be set by a user of the vehicle 10, e.g., by selecting which of comfort and/or fuel efficiency shall be prioritized.

In some embodiments, the predetermined vehicle dynamics model may be able to determine that the set of vehicle condition signals indicates a predetermined vehicle behaviour associated with an elevated air consumption and therefore there is not a need to supply the air bag 24 with air from the source of pressurized air 23. This may be performed by mapping the set of vehicle condition signals may be mapped to predefined vehicle behaviors with respect to air consumption and/or comfort level.

Machine Learning Model

Embodiments herein may be based at least partly on the trained machine learning model, e.g., as discussed in action 404. The trained machine learning model may comprise at least one regression learner and/or at least one decision tree. In some embodiments, the trained machine learning model comprises one or more NNs. The set of vehicle condition signals may be fed into the trained machine learning model, and the trained machine learning model may determine whether or not there is a need to supply the air bag 24 with air from the source of pressurized air 23. The output of the trained machine learning model may be an output signal which can be used to prevent the pressurized air to be fed from said source of pressurized air 23 to said air bag 24. For example, the output signal may be used to control the solenoid control valve 31.

The trained machine learning model may be trained as discussed in action 404 and/or based on sensor input and/or vehicle conditions, air consumption of one or more training vehicles, and whether or not the pressurized air to be fed from said source of pressurized air 23 to said air bag 24 was prevented or not by the respective training vehicle, e.g., for different inputs. The one or more training vehicles may or may not comprise the vehicle 10. As the trained machine learning model is trained based on an air cons For some embodiments when using the trained machine learning model, e.g., when the trained machine learning model comprises a regression learners and/or a decision tree, a feature that may be useful to include when training the machine learning model and/or as part of the set of vehicle condition signals when using the trained machine learning model are locations of where the corresponding sensor data and/or vehicle condition signals are obtained, i.e. for training the trained machine learning model, and the location of the vehicle when using the machine learning model to determine whether or not there is a need to supply the air bag 24 with air from the source of pressurized air 23. In this way, it may be possible to train the trained machine learning model can more accurately be trained for the correct data. The trained machine learning model may be trained to achieve a lowest air consumption. In some embodiments, the trained machine learning model also considers a comfort level. For example, the machine learning model may additionally be trained with a comfort level by using values from an accelerometer at a seat of the one or more training vehicles as a ground truth. A high low comfort level is indicated by high vibrations in a seat, e.g., greater than a threshold, e.g., as measured by the accelerometer. A high comfort level may be indicated by low vibrations from a seat, e.g., lower than a threshold, e.g., as measured by the accelerometer. In some of these embodiments, the trained machine learning model may be trained for lower air consumption and with consideration for improved comfort level. For example when the trained machine learning model comprises a decision tree, a split criterion to use may be a Gini diversity index. The machine learning model may use any suitable method for validation.

Embodiments herein may be performed by the trained machine learning model comprising one or more NNs. The NNs may be deep or shallow, e.g., depending on an amount of training data and/or number of condition signals in the set of vehicle condition signals. A number of hidden layers and/or neurons may be selected based on a training time and a desired accuracy. The training of the one or more NNs may be according to any one or more out of the following training methodologies:

Levenberg—Marquardt,
Bayesian Regularization, and
Scale conjugate gradient.

Figure 5:
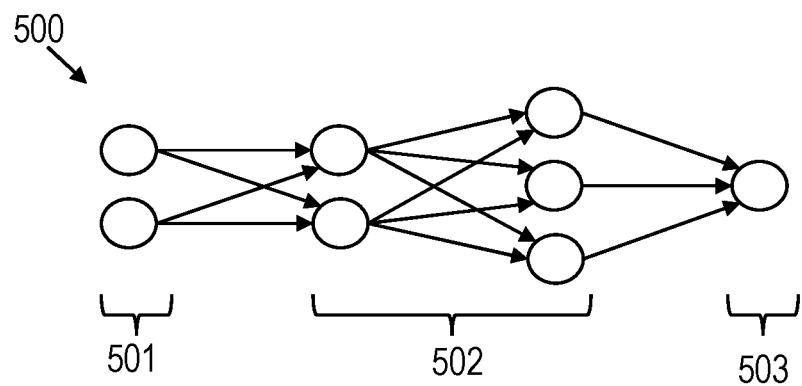
FIG. 5 is an example machine learning model according to embodiments herein.

An example NN 500 is illustrated in FIG. 5. The NN 500 comprises an input layer 501, e.g., wherein at least two vehicle condition signals out of the set of condition signals may be fed as input. The NN 500 comprises a set of hidden layers 502. In this example, two hidden layers are part of the hidden layers 502 in NN 500, however, any suitable number of hidden layers may be considered. The NN 500 comprises an output layer 503, e.g., for the output signal. In this example, only one output is considered, e.g., for the signal of whether or not there is a need to supply the air bag 24 with air from the source of pressurized air 23. However, other output signals may also be present, such as a predicted comfort level and/or predicted air consumption level depending on whether to prevent the pressurized air to be fed from said source of pressurized air 23 to said air bag 24.

Figure 6:
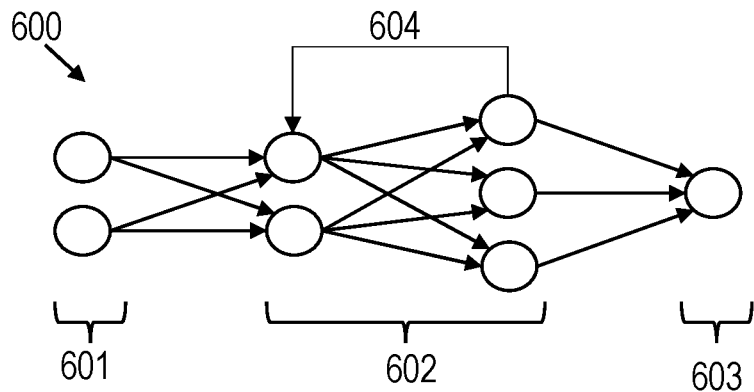
FIG. 6 is an example machine learning model according to embodiments herein.

The trained machine learning model may in some embodiments comprise an RNN which may be optimized and trained based on a user input and/or a configuration. The user input and/or the configuration may be an option of increasing comfort and/or reducing air consumption and/or a weighted combination of both. An example RNN 600 is illustrated in FIG. 6. The RNN 600 comprises an input layer 601, e.g., wherein at least two vehicle condition signals out of the set of condition signals may be fed as input. The RNN 600 comprises a set of hidden layers 602 e.g., similar to example NN 500. The RNN 500 comprises an output layer 603, e.g., for an output signal, e.g., similar to example NN 500.

The RNN 600 may comprise a feedback signal 604, which feedback signal 604 comprises information of what shall be optimized for. For example, if air consumption is selected, a feedback of air consumed based be fed back and used to continuously train the trained machine learning model for improved air consumption. As air consumption is improved, i.e. reduced, it follows that fuel and/or energy consumption is also reduced as less fuel and/or energy is needed to generate the pressurized air through an air-compressor.

If comfort is selected, estimated acceleration at one or more seats would be fed back and the trained machine learning model would continuously be trained to reduce the acceleration. In some embodiments, when the trained machine learning model tries to optimize for fuel, the trained machine learning model may end up blocking the port always since no air will be consumed and therefore best for air consumption, but that would make the ride very uncomfortable and estimated acceleration may be very high. So, a system which at least partly weights towards comfort may be able to find a good balance between comfort and air consumption.

The trained machine learning model may in some embodiments comprise a reinforcement machine learning model also referred to as a Reinforcement Learning (RL) model. The RL model is continuously trained and optimized while the vehicle 10 is operating. The RL may use a reward and/or penalty when taking a good or bad decision, e.g., which may be evaluated during runtime, which is the basis of training the learning model. Some pretraining of the RL model may also be possible, e.g., using any suitable training method above.

Figure 7:
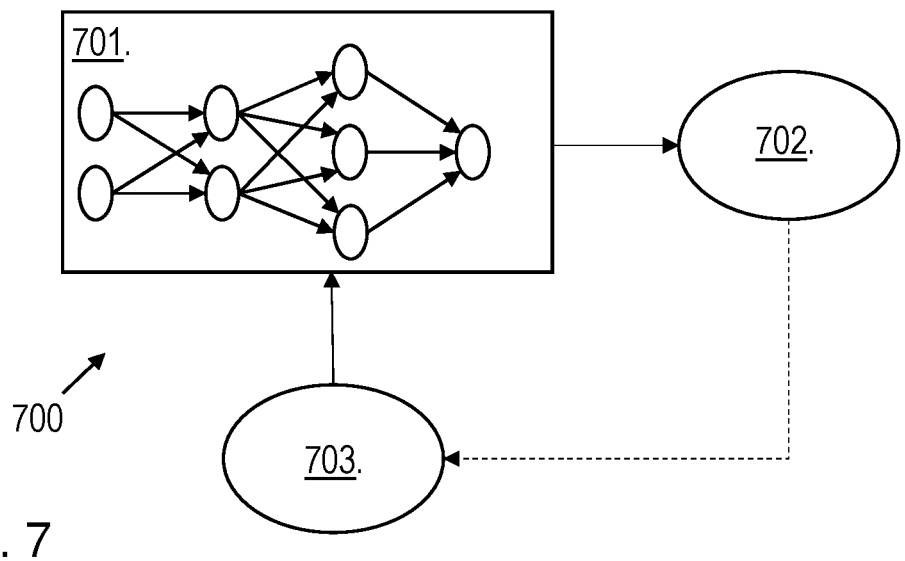
FIG. 7 is an example machine learning model according to embodiments herein.

An example RL model 700 is illustrated in FIG. 7. The RL model 700 comprises an NN 701, e.g., any suitable NN such as NN 500 or RNN 600. Using the NN 701, a decision 702 is made, e.g., whether or not to prevent the pressurized air to be fed from said source of pressurized air 23 to said air bag 24. The effect of the decision 702 is monitored and evaluated. Based on what the RL model 700 shall be optimized for, a feedback signal 703 is sent back to the NN

701. The feedback signal is based on the monitoring and evaluation of the decision 702. The evaluation of the decision 702 may for example comprise an evaluation of whether or not the decision led to an increase or decrease in air consumption and/or comfort level. The evaluation of the decision 702 may comprise both an immediate evaluation, i.e. is the decision 702 immediately improving the air consumption and/or comfort level of the vehicle 10, as well as a long-term evaluation, i.e. did the air consumption and/or comfort level of the vehicle 10 increase and/or decrease over a set period of time, e.g. a minute, after the decision 702. The feedback signal may comprise a reward and/or a penalty. For example, a penalty may be used when air consumption is increased over the set period of time. A reward may be used when the air consumption is decreased over the set period of time. Additionally or alternatively, a penalty may be used when a comfort level is reduced over the set period of time, and a reward may be used when the comfort level is increased over the set period of time. The air consumption may be weighted based on the comfort level. A penalty may trigger a reduction of one or more weights in a path of the NN 701 leading to the decision 702. A reward may trigger an increase of one or more weights in the path of the NN 701 leading to the decision 702.

To perform the method actions described herein, the control unit 70 may be configured to control a flow from the source of pressurized air 23 to the air bag 24 of the pneumatic suspension arrangement 20 in the vehicle 10. The control unit 70 may be configured to perform any one or more of the above actions 401-405, and/or any of the other examples or embodiments herein. The control unit 70 may for example comprise an arrangement depicted in FIGS. 8a and 8b.

The control unit 70 may comprise an input and output interface 800 configured to communicate with any necessary components and/or entities of embodiments herein. The input and output interface 800 may comprise a wireless and/or wired receiver (not shown) and a wireless and/or wired transmitter (not shown). The control unit 70 may be arranged in any suitable location of the vehicle 10, e.g., as part of the pneumatic suspension arrangement 20. The control unit 70 may use the input and output interface 800 to control and communicate with sensors, actuators, suspension arrangements, subsystems, and interfaces in the vehicle 10, e.g., by using any one or more out of: CAN, ethernet cables, Wi-Fi, Bluetooth, and/or other network interfaces.

The control unit 70 may be configured to, e.g. by means of an obtaining unit 801 comprised in the control unit 70, obtain a set of vehicle condition signals comprising at least two vehicle condition signals, each vehicle condition signal being indicative of an individual current condition associated with the vehicle 10.

The control unit 70 may be configured to, e.g. by means of a determining unit 802 comprised in the control unit 70, on the basis of said set of vehicle condition signals, determine whether or not there is a need to supply the air bag 24 with air from the source of pressurized air 23. The control unit 70 may be configured to, e.g. by means of a preventing unit 803 comprised in the control unit 70, in response to determining that there is not a need to supply the air bag 24 with air from the source of pressurized air 23, prevent pressurized air to be fed from said source of pressurized air 23 to said air bag 24.

The control unit 70 may be configured to, e.g. by means of a combining unit 804 comprised in the control unit 70, combine at least two vehicle condition signals in said set of vehicle condition signals to a joint condition signal. In some of these embodiments, the control unit 70 may be configured to compare, e.g. by means of a comparing unit 805 comprised in the control unit 70, said joint condition signal to a joint condition threshold value to determine, e.g. by means of the determining unit 802 comprised in the control unit 70, whether or not there is a need supply the air bag 24 with air from the source of pressurized air 23.

The control unit 70 may be configured to the following for each vehicle condition signal of at least two vehicle condition signals in said set of vehicle condition signals: compare said vehicle condition signal to an individual condition signal threshold value e.g. by means of the comparing unit 805 comprised in the control unit 70, and on the basis of the comparisons, determine, e.g. by means of the determining unit 802 comprised in the control unit 70, whether or not there is a need supply the air bag 24 with air from the source of pressurized air 23.

Figure 8A:
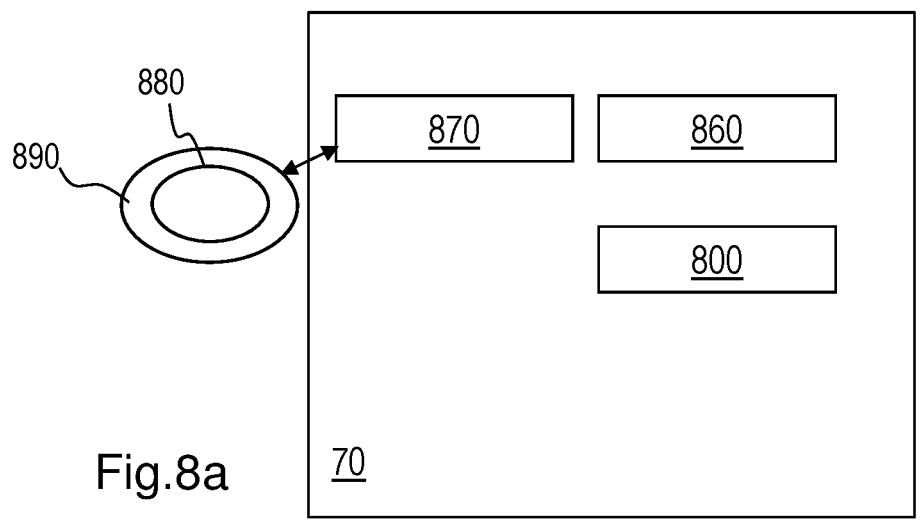
FIG. 8a-8b are schematic block diagrams illustrating a control unit according to embodiments herein.
Figure 8B:
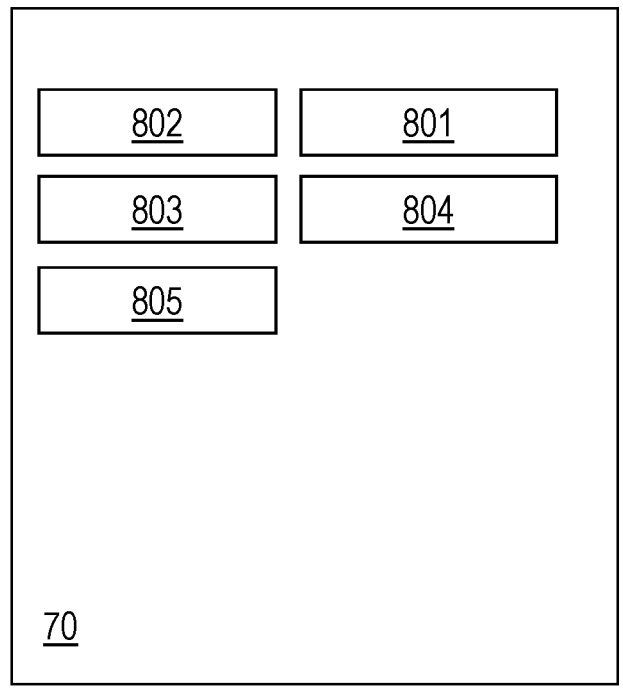

The embodiments herein may be implemented through a processor or one or more processors, such as the processor 860 of a processing circuitry in the control unit 70 depicted in FIG. 8a, together with computer program code for performing the functions and actions of the embodiments herein. The program code mentioned above may also be provided as a computer program medium, for instance in the form of a data computer readable medium carrying computer program code for performing the embodiments herein when being loaded into the control unit 70. One such computer readable medium may be in the form of a memory stick. The computer program code may furthermore be provided as pure program code on a server and downloaded to the control unit 70.

The control unit 70 may further comprise a memory 870 comprising one or more memory units. The memory 870 comprises instructions executable by the processor in control unit 70. The memory 870 is arranged to be used to store e.g. information, indications, data, configurations, sensor data, vehicle conditions, positioning information, scanned surroundings of the vehicle 10, road profile of a road to be travelled by the vehicle 10, and applications to perform the methods herein when being executed in the control unit 70.

In some embodiments, a computer program 880 comprises instructions, which when executed by a computer, e.g. the at least one processor 860, cause the at least one processor of the control unit 70 to perform the actions 401-405 above.

In some embodiments, a computer-readable storage medium 890 comprises the respective computer program 880. The computer-readable storage medium 890 may comprise program code for performing the steps of any one of actions 401-405 above when said program product is run on a computer, e.g. the at least one processor 860.

Those skilled in the art will appreciate that the units in the control unit 70 described above may refer to a combination of analogue and digital circuits, and/or one or more processors configured with software and/or firmware, e.g. stored in the control unit 70, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC). Furthermore, the control unit 70 may comprise any suitable specialized circuits, e.g., for the one or more logic gates and/or the one or more NNs.

It is to be understood that the present invention is not limited to the embodiments described above and illustrated in the drawings; rather, the skilled person will recognize that many changes and modifications may be made within the scope of the appended claims.

Furthermore, all above embodiments and/or examples may be combined in any suitable manner.

The invention claimed is:

1. A method for controlling a flow from a source of pressurized air to an air bag of a pneumatic suspension arrangement in a vehicle, the method comprising:
   obtaining a set of vehicle condition signals comprising at least two vehicle condition signals, each vehicle condition signal being indicative of an individual current condition associated with said vehicle,
   on the basis of said set of vehicle condition signals, determining whether or not there is a need to supply the air bag with air from the source of pressurized air, and
   in response to determining that there is not a need to supply the air bag with air from the source of pressurized air, preventing pressurized air to be fed from said source of pressurized air to said air bag,
   wherein determining whether or not there is a need to supply the air bag with air from the source of pressurized air comprises using a predetermined vehicle dynamics model to predict an air consumption based on the set of vehicle condition signals, and wherein preventing the pressurized air to be fed from said source of pressurized air to said air bag is performed when the predicted air consumption exceeds a threshold.

2. The method according to claim 1, wherein the method comprises combining at least two vehicle condition signals in said set of vehicle condition signals to a joint condition signal and comparing said joint condition signal to a joint condition threshold value to determine whether or not there is a need to supply the air bag with air from the source of pressurized air.

3. The method according to claim 1, wherein the method comprises the following for each vehicle condition signal of at least two vehicle condition signals in said set of vehicle condition signals:
   comparing said vehicle condition signal to an individual condition signal threshold value, and
   on the basis of the comparisons, determining whether or not there is a need to supply the air bag with air from the source of pressurized air.

4. The method according to claim 1, wherein a flow from the source of pressurized air to the air bag is controlled by a pneumatic flow control valve, wherein the pneumatic flow control valve comprises a pilot port which when pressurized is arranged to block a flow from the source of pressurized air to the air bag, and wherein preventing the pressurized air to be fed from said source of pressurized air to said air bag comprises pressurizing the pilot port.

5. The method according to claim 4, wherein the pneumatic suspension arrangement comprises a solenoid control valve attached with the source of pressurized air and the pilot port, and wherein preventing the pressurized air to be fed from said source of pressurized air to said air bag comprises controlling the solenoid control valve to pressurize the pilot port.

6. A method for controlling a flow from a source of pressurized air to an air bag of a pneumatic suspension arrangement in a vehicle, the method comprising:
   obtaining a set of vehicle condition signals comprising at least two vehicle condition signals, each vehicle condition signal being indicative of an individual current condition associated with said vehicle,
   on the basis of said set of vehicle condition signals, determining whether or not there is a need to supply the air bag with air from the source of pressurized air, and
   in response to determining that there is not a need to supply the air bag with air from the source of pressurized air, preventing pressurized air to be fed from said source of pressurized air to said air bag,
   wherein determining whether or not there is a need to supply the air bag with air from the source of pressurized air, comprises using a trained machine learning model with the set of vehicle condition signals as input,
   wherein the trained machine learning model is a reinforcement machine learning model arranged to determine whether or not there is a need to supply the air bag with air from the source of pressurized air by predicting an air consumption for a time period when preventing and when not preventing the pressurized air to be fed from said source of pressurized air to said air bag.

7. The method according to claim 1, wherein the set of vehicle condition signals comprises any one or more out of:
   a vehicle condition signal indicative of a brake pedal position of the vehicle,
   a vehicle condition signal indicative of a brake pressure of at least one brake of the vehicle,
   a vehicle condition signal indicative of a throttle of an engine of the vehicle,
   a vehicle condition signal indicative of a velocity and/or a speed of the vehicle,
   a vehicle condition signal indicative of a gear and/or a gear shifting of the vehicle,
   a vehicle condition signal indicative of a roll and/or a roll rate of the vehicle,
   a vehicle condition signal indicative of a pitch and/or a pitch rate of the vehicle,
   a vehicle condition signal indicative of a yaw and/or a yaw rate of the vehicle,
   a vehicle condition signal indicative of a steering input of the vehicle,
   a vehicle condition signal indicative of a load and/or a weight of the vehicle,
   a vehicle condition signal indicative of a position of the vehicle, and
   a vehicle condition signal indicative of a road profile of a road travelled by the vehicle.

8. A control unit configured to perform the method according to claim 1.

9. A pneumatic suspension arrangement for a vehicle comprising the control unit according to claim 8, and wherein the suspension arrangement comprises a source of pressurized air arranged to supply pressurized air to an air bag.

10. The pneumatic suspension arrangement according to claim 9 comprising a pneumatic flow control valve arranged to control a flow from the source of pressurized air to the air bag, and wherein the pneumatic flow control valve comprises a pilot port which when pressurized is arranged to block a flow from the source of pressurized air to the air bag.

11. A vehicle comprising the pneumatic suspension arrangement according to claim 9.

12. A non-transitory computer readable medium comprising program code for performing the steps of claim 1 when said program is run on a computer.

13. A computer readable medium carrying a computer program comprising program code for performing the steps of claim 1 when the computer program is run on a computer.

* * * * *